United States Patent Office 3,108,018
Patented Oct. 22, 1963

3,108,018
RESIN COATED GRAPHITIZED FABRIC
Robert Bee Lewis, Newark, Del., assignor to E. I. du Pont de Nemours and Company, Wilmington, Del., a corporation of Delaware
No Drawing. Filed May 27, 1960, Ser. No. 32,120
7 Claims. (Cl. 117—161)

This invention relates to a novel polymer coated fabric which is particularly useful as a self-lubricating bearing material.

The term "self-lubricating bearing" designates a bearing whose working surface has antifriction characteristics sufficient to enable the bearing to function satisfactorily in the absence of an applied lubricant, such as oil or grease. The working surface of the bearing is the surface in contact with the rotating shaft or other moving member of the machine in which it is used.

A common form of self-lubricating bearing consists of a cylindrical metal housing containing a liner of a polymeric material which has a low coefficient of friction and which serves as the working surface of the bearing. The liner is referred to as a self-lubricating bearing material.

Self-lubricating bearings are also commonly referred to as nonlubricated bearings, oilless bearings or dry bearings. Lubricants are sometimes applied to such bearings, for example to achieve better efficiency or longer life under severe operating conditions, but generally are not necessary under ordinary conditions.

An oil or grease lubricated bearing is often either impractical, undesirable or unreliable; for example, when (a) the location of the bearing does not permit periodic inspection and application of lubricant; (b) there is danger of the lubricant trapping harmful dirt or grit and carrying it into the working surface; (c) the bearing is exposed to solvents or chemicals which remove the lubricant or render it ineffective; or (d) the presence of lubricant leads to product contamination, for example in certain machinery used in the manufacture of textiles, plastic film, food, paper, chemicals, drugs and tobacco. Moreover, in view of maintenance requirements, there are obvious economical drawbacks to the use of oil or grease lubricated bearings.

Many attempts have been made to provide a self-lubricating bearing which overcomes the limitations and drawbacks of oil or grease lubricated bearings. Among the more important bearings proposed are those employing a polymeric material as the working surface, such as for example molded polytetrafluoroethylene containing chopped or staple glass fibers or finely divided lead or graphite, polytetrafluoroethylene fabric or felt, polytetrafluoroethylene coated glass fabric, molded or extruded nylon, or molded phenolic resin containing molybdenum disulfide.

While some of the previously known polymeric bearing materials have been quite satisfactory for a number of uses, even the more promising ones have had a tendency to fail on extended use under conditions of high speed, for example when the surface speed of the rotating shaft is about 200 ft./min. or more. Failures have been especially common when high speed operation has been accompanied by a relatively high shaft load, for example, up to about 50 p.s.i. or more.

It is believed that a major cause of such failures has been the retention of frictional heat at the working surface. When operated at high speed, particularly while under high load, the working surfaces of these bearings have disintegrated due to overheating.

Costly shutdowns of manufacturing operations often follow bearing failure.

It is therefore the primary object of this invention to provide a new and improved self-lubricating bearing material.

A more specific object is to provide a self-lubricating bearing material which is operable for extended periods under high speed conditions.

A still more specific object is to provide a sleeve bearing capable of extended operation without application of lubricant at a shaft speed of at least 200 ft./min., especially when such a speed is accompanied by a shaft load of up to 50 p.s.i. or more.

A further object is the provision of a novel polymer coated fabric having utility outside of the bearing field.

Other important objects will be apparent from the description of the invention which follows.

The invention broadly comprises a graphite fabric coated with solid fluoroethylene polymer.

The term "coated" is used in a broad sense throughout the specification and claims; it signifies the result of impregnating and/or surface-coating the fabric with the fluoroethylene polymer. It does not imply that all, or even a major proportion, of the interstices or other voids of the fabric must be filled or covered with polymer, although such conditions might be best for some uses. However, in the case of a coated fabric which is merely impregnated with the polyfluoroethylene, it is preferred to have the polymer clinging to a major proportion of the fibers of the fabric. And in the case of a coated fabric which is merely surface-coated on at least one side with the polymer, it is preferred to have the polymer clinging to a major proportion of the originally exposed fiber surfaces of the coated side. In both cases just cited, it is usually best to have the polymer relatively uniformly distributed along the length and width of the fabric.

A "graphite fabric" is a fabric comprised of fibers consisting essentially of carbon atoms arranged in the crystal form characteristic of graphite. The X-ray diffraction pattern of the carbonized fibers is practically the same as that of graphite.

Best results are usually obtained when the graphite fabric is in the form of a woven fabric. However, useful results are also obtained when it is in the form of a knitted fabric or a nonwoven fabric, for example, a water-leaf, or a web of cross-laid carded fibers or continuous filaments which web may or may not not have been passed through a needle-loom. Graphite fabric is quite delicate and easily torn even in the woven form.

Graphite fabric can be made by the carefully controlled pyrolysis of a woven or nonwoven fabric of organic fibers, preferably cellulosic fibers, and still more preferably rayon fibers. For example, a woven graphite fabric can be produced by gradually and uniformly heating a woven rayon fabric, preferably in a controlled environment such as an inert gas, to an elevated temperature sufficient to remove substantially all of the non-carbon components of the rayon and to cause pyrolytic conversion of the rayon fibers to carbon fibers, the carbon atoms of which are arranged in the crystal form characteristic of graphite.

Graphite fabric can be used in combination with other types of fibrous materials in making the products of this invention. For example, fibers or fabrics of metal, glass or asbestos can be incorporated into or associated with the graphite fabric. Such combinations sometimes result in a product having improved strength, load bearing capacity or thermal or electrical conductivity.

The graphite fabric is impregnated and/or surface-coated with a solid polymer of fluoroethylene, such as for example polytetrafluoroethylene, polymonochlorotrifluoroethylene, or a copolymer of tetrafluoroethylene with a minor proportion of a monomer copolymerizable therewith such as hexafluoropropene, monochlorotrifluoroethylene, vinyl fluoride or vinylidene fluoride. Polytetrafluoroethylene, such as the high molecular weight solid polymer of tetrafluoroethylene available under the trademark "Teflon," is the preferred polymer when it is desired to obtain maximum resistance to heat and chemicals and minimum coefficient of friction.

At least under normal conditions of use, the polyfluoroethylene should be a solid, that is, not a fluid. In other words, it should be a "normally solid" polymer. Preferably it should be a solid at temperatures upwards of 212° F.

The polyfluoroethylene can be applied to the graphite fabric by any known coating method. A preferred method is to apply an aqueous dispersion or solution of the polymer to the fabric by dipping or by doctor-knifing followed by drying in a heat zone. Another useful method is to prepare a slurry of fibrils of the polymer, for example, by following the teaching of copending application S.N. 773,816, filed November 14, 1958, now U.S. Patent No. 3,026,229, by F. S. Wilcox, depositing a waterleaf of the fibrils directly onto the graphite fabric while the latter is supported on a 100-mesh screen in a papermakers' sheet mold, drying, and consolidating the product in a heated press. Another useful method comprises spreading a layer of powdered polyfluoroethylene onto the graphite fabric, and consolidating the coated material in a press heated to the fusion temperature of the polymer. Still another method comprises laminating the fabric to a preformed film of the polymer while the latter is heated to its fusion temperature, for example in a laminating press.

The polyfluoroethylene applied to the graphite fabric can contain one or more additives, for example stabilizers, plasticizers, pigments, or fillers such as finely divided lead, graphite or molybdenum disulfide.

One side of the fabric can be surface-coated with one fluoroethylene polymer and the other side can be coated with either the same or another fluoroethylene polymer, or a non-fluoroethylene polymer; or the other side can be coated with metal, bonded to a metal housing, or laminated to another sheet material. Two or more sheets of the polyfluoroethylene-coated fabric can be laminated together in a press while heated to the fusion temperature of the polymer.

When the fluoroethylene polymer is applied to the fabric in the form of particles (either dry or in a liquid dispersion), optimum product strength and durability are usually obtained when the coated fabric is subjected to sufficient heat, or heat and pressure, to fuse the particles together. Further, it is generally preferred to have the fabric embedded in and/or integrally united to a substantially continuous phase or layer of polyfluoroethylene.

Optimum thickness of surface-coatings of the polymer in bearing applications will be governed by such factors as cost of the polymer applied, desired bearing life and durability, and operating speed as related to thermal conductivity requirements. Ordinarily a surface-coating thickness of about 1 to 5 mils is preferred when the fabric is impregnated with the polymer, and about 3 to 10 mils is preferred when the fabric is not impregnated.

The present invention brings about a worthwhile advance in the self-lubricating bearing art. Bearings employing this new coated fabric material operate efficiently for extended periods under high speed and/or high temperature conditions in the absence of oil, grease or other applied lubricants. One important advantage of these novel bearings is their resistance to attack by solvents and corrosive chemicals. An advantage of greater importance is their excellent performance when used in contact with shafts rotating at high speed while under relatively high load. Their performance under such conditions is characterized by surprisingly long life, low coefficient of friction and moderate temperature of the working surface.

The polyfluoroethylene coated graphite fabric described above has many valuable industrial applications, for example in sleeve bearings as well as in thrust washers, shaft packing, sealing rings, piston rings, bushings, slides and ball-bearing cages. In addition to its utility in industrial machinery as a self-lubricating bearing or seal, it is similarly useful in automobiles, aircraft, power tools and business and domestic appliances. Outside of the bearing field, the product has utility wherever there is need for a polymeric sheet material having the unique combination of properties including good thermal conductivity, low coefficient of friction, toughness, and resistance to heat and most solvents and corrosive chemicals. Gasketing, tubing, conveyor belting, laboratory bench tops, trays and protective clothing exemplify such uses.

The following examples are given for the purpose of illustrating the invention; all quantities shown are on a weight basis unless otherwise indicated.

EXAMPLE 1

A polytetrafluoroethylene coated graphite fabric is prepared by dipping a strip of woven graphite fabric in an aqueous suspensoid of the polymer. The fabric is National Carbon Company Graphite Fabric Grade WCB, which has a plain weave, a thread count of 27 x 25, a weight of 7.25 ounces per square yard, a thickness of 22 mils, a sublimation temperature of about 3600° C., and a grab tensile strength of 4 x 5 pounds (warp x fill). Grab tensile strength is the breaking strength as measured by the Grab Method (A.S.T.M. Method D39–49) on a tensile testing machine. The threads are composed of substantially pure carbon in the graphite form. The fabric itself is flimsy and quite unsatisfactory as a generally useful self-lubricating bearing material.

The fabric is dipped 4 times in an aqueous suspensoid composed of 46 parts finely divided polytetrafluoroethylene ("Teflon" from Du Pont), 6 parts "Triton" X–100 wetting agent (octyl phenyl polyglycol ether), and 48 parts water. After each successive dip, the suspensoid-coated fabric is dried in a 350° F. heat zone. When dried after the fourth dip, the coated fabric is subjected to a temperature of 700° F. for a sufficient period of time (about 5 minutes) to fuse the "Teflon" particles together, thereby forming a substantially continuous phase of the polymer around the threads and on both surfaces of the fabric but not completely filling the voids of the fabric. Thus, the fabric is both impregnated and surface-coated with fused "Teflon."

The coated fabric has the surprisingly good grab tensile strength of 105 x 99 pounds (warp x fill); this represents about a 20-fold increase over the strength of the uncoated fabric.

Microscopic examination of the coated fabric indicates that the "Teflon" particles have unexpectedly high affinity for the fabric, since they have surrounded the individual threads and penetrated into the fiber bundles of the fabric considerably more thoroughly than would be expected with other fabrics such as glass fabric.

The coated fabric, which now has a weight of 20.5 ounces per square yard and a thickness of 25 mils, is pressed in a smooth-platen press at a temperature of 700° F. and a pressure of 500 pounds per square inch for 2 minutes. When cooled and removed, the pressed product has a thickness of 13 mils.

The "Teflon" coated graphite fabric produced in this example is useful as a self-lubricating bearing material. It is also useful for the production of gasketing, tubing and other articles outside the bearing field as previously listed.

EXAMPLE 2

A 5 mil thick film made from a copolymer of 85 parts of tetrafluoroethylene and 15 parts of hexafluoropropene is interposed between two pieces of the 25 mil product of Example 1. The 3-layer assembly is pressed in a smooth-platen press at a temperature of 700° F. and a pressure of 500 p.s.i. for 2 minutes. When cooled and removed from the press the resultant laminated self-lubricating bearing material has a thickness of 36 mils.

A self-lubricating sleeve bearing is prepared for use on the one-inch diameter rotating shaft of a power-transfer machine to be used in the manufacture of cellophane. A one-inch wide strip of the 36 mil bearing material produced above is cut to a length sufficient to fit as a sleeve on the shaft with a $\frac{1}{32}$ inch clearance between the adjacent bias-cut ends. The cut-to-size strip is inserted as a free-floating liner inside a metal housing having the necessary inside dimensions and having an inwardly projecting lip at both ends to prevent movement of the liner along the shaft.

When the resulting sleeve bearing is assembled in the machine, there is a 2-3 mil diametrical clearance between the working surface of the bearing and the contiguous surface of the shaft. The machine containing the novel bearing of this example is operated with a shaft surface speed of 200 feet per minute and a shaft load of 50 p.s.i. No oil, grease or other lubricant is applied to the bearing or shaft. After 1000 hours of operation under these conditions the bearing is still performing satisfactorily. Inspection of the working surface of the bearing shows that it has suffered no substantial damage or wear.

After a new bearing made in the same manner as the one just tested is assembled in the machine, the machine is operated so that the surface speed of the shaft is 350 feet per minute and the load on the shaft is 29 p.s.i. The bearing is inspected after 1000 hours of oilless operation and is found to be in good condition.

A new bearing as described above is installed and used in the machine while the shaft speed is 700 feet per minute and the load is 14 p.s.i. As in the previous test, the bearing is inspected after 1000 hours of oilless operation and is found to be in good condition.

For the sake of comparison, bearings lined with five different prior art self-lubricating bearing materials are installed successively in the machine used in the above tests and tested in a like manner. The results are shown in Table 1, which also includes the results given above for the novel bearing of Example 2.

*Table 1*

| | Hours of operation before bearing failed | | |
|---|---|---|---|
| Speed | 200 ft./min. | 350 ft./min. | 700 ft./min. |
| Load | 50 p.s.i. | 29 p.s.i. | 14 p.s.i. |
| Bearing liner: | | | |
| Ex. 2 | [1]1,000 | [1]1,000 | [1]1,000 |
| A | 660 | 500 | 400 |
| B | [1]1,000 | 560 | no data |
| C | 150 | 100 | no data |
| D | 80 | 50 | 1 |
| E | 10 | 5 | 0.8 |

[1] Bearing still performing satisfactorily; test discontinued at 1,000 hours.

The bearing liner materials A to E in Table 1 are as follows: A is composed of porous bronze impregnated and surface-coated with a blend of 80 parts "Teflon" and 20 parts powdered lead; B is composed of molded "Teflon" containing unknown additives and reinforcing agents intend to enhance its performance as a bearing; C is composed of a molded blend of 75 parts "Teflon" and 25 parts graphite powder; D is composed of "Teflon"-coated woven glass fabric; E is composed of molded "Teflon."

In the 350 ft./min. test with bearing liners "A" and "B," and with the novel bearing of this example, the temperature of the portion of the shaft adjacent the bearing and the temperature of the bearing housing are recorded after 100 hours of operation. As shown in Table 2, cooler operation is obtained with the novel bearing (indicated as Ex. 2).

*Table II*

| Bearing | Temperature (° F.) after 100 hours | |
|---|---|---|
| | Housing | Shaft |
| Ex. 2 | 165 | 180 |
| A | 220 | 300 |
| B | 265 | 370 |

EXAMPLE 3

Another polymer coated fabric having utility as a self-lubricating bearing material in addition to other uses is prepared as follows. A strip of the woven graphite fabric described in Example 1 is dipped 4 times in an aqueous suspensoid composed of 50 parts of finely divided copolymer of about 85 parts tetrafluoroethylene and about 15 parts hexafluoropropene, 6 parts "Triton" X-100 wetting agent, and 4 parts water. After each successive dip, the applied copolymer is dried in a 350° F. heat zone. The coating is fused in a 650° F. heat zone.

The coated fabric has a grab tensile strength of 75 x 70 pounds (warp x fill).

Next, the copolymer coated fabric is pressed in a smooth-platen press at a temperature of 570° F. and a pressure of 500 p.s.i. for 2 minutes. When cooled and removed from the press the coated fabric has a thickness of 34 mils.

A self-lubricating bearing is made from the product of this example and tested in the manner described in Example 2 while the shaft speed is 700 feet per second and the shaft load is 14 p.s.i. The bearing is inspected after 150 hours of oilless operation and is found to be in useful condition. After 100 hours of operation the temperature of the shaft adjacent the bearing and the temperature of the bearing housing are both 109° F.

EXAMPLE 4

A polymer coated fabric having similar utility to the product of Example 3 is prepared by repeatedly dipping a strip of the woven graphite fabric described in Example 1 in a dispersion of high molecular weight polymonochlorotrifluoroethylene ("Kel-F") in xylene. After each successive dip the "Kel-F" coating is dried and fused by gradually heating it to about 450° F. When the dry weight of the coated fabric is 22 ounces per square yard, the dipping is discontinued. Finally, the coated fabric is pressed in a smooth-platen press at a temperature of 450° F. and a pressure of 500 p.s.i. for 2 minutes.

I claim:

1. As a new article of manufacture, a graphite fabric coated with solid fluoroethylene polymer.

2. An article as defined in claim 1 wherein the graphite fabric is in the form of a woven fabric.

3. An article as defined in claim 1 wherein the fabric is impregnated and surface-coated on at least one side with the polymer.

4. An article as defined in claim 1 wherein said polymer is in a fused condition and in the form of a substantially continuous polymeric phase.

5. An article as defined in claim 1 wherein said polymer is polyetrafluoroethylene.

6. An article as defined in claim 1 wherein said polymer is a copolymer of about 85% by weight of tetrafluoroethylene and about 15% by weight of hexafluoropropene.

7. A self-lubricating bearing material comprising a woven graphite fabric coated with solid fluoroethylene polymer.

References Cited in the file of this patent

UNITED STATES PATENTS

| | | |
|---|---|---|
| 2,838,829 | Goss et al. | June 17, 1958 |
| 2,876,131 | Kumnick et al. | Mar. 3, 1959 |

FOREIGN PATENTS

| | | |
|---|---|---|
| 721,211 | Great Britain | Jan. 5, 1955 |
| 821,472 | Great Britain | Oct. 7, 1959 |
| 1,062,613 | Germany | July 30, 1959 |

OTHER REFERENCES

"Graphite Now Produced in Flexible Textile Form," published in Mechanical Engineering, page 12, June 1959. Copy in Div. 21.